United States Patent
Oh et al.

(10) Patent No.: US 10,244,603 B2
(45) Date of Patent: Mar. 26, 2019

(54) OLED STAND

(71) Applicant: LG Display Co., Ltd., Seoul (KR)

(72) Inventors: Seung Chul Oh, Seoul (KR); Jung Hyoung Lee, Daejeon (KR); Jong Seok Kim, Daejeon (KR); Hye Cho Shin, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/507,843

(22) PCT Filed: Sep. 3, 2014

(86) PCT No.: PCT/KR2014/008246
§ 371 (c)(1),
(2) Date: Mar. 1, 2017

(87) PCT Pub. No.: WO2016/035904
PCT Pub. Date: Mar. 10, 2016

(65) Prior Publication Data
US 2017/0311410 A1    Oct. 26, 2017

(51) Int. Cl.
*F21S 8/08* (2006.01)
*H05B 33/08* (2006.01)
(Continued)

(52) U.S. Cl.
CPC ............ *H05B 33/0896* (2013.01); *F21S 6/00* (2013.01); *H01L 51/5234* (2013.01);
(Continued)

(58) Field of Classification Search
CPC .... H05B 33/0896; H05B 33/10; H05B 33/12; H05L 51/5234; F21Y 2115/15
See application file for complete search history.

(56) References Cited

U.S. PATENT DOCUMENTS 6,762,553 B1    7/2004  Yokogawa et al.
6,787,994 B2 *  9/2004  Cok ................. F21S 6/003
                                                257/100
(Continued)

FOREIGN PATENT DOCUMENTS

CN          1957485       5/2007
CN         203215309      9/2013
(Continued)

OTHER PUBLICATIONS

International Search Report dated May 12, 2015, for corresponding International Patent Application No. PCT/KR2014/008246.

*Primary Examiner* — Jason M Han
(74) *Attorney, Agent, or Firm* — Morgan, Lewis & Bockius LLP

(57) ABSTRACT

The present invention relates to an OLED standing lamp in which a lighting unit includes a band-shaped transparent film and a band-shaped casing plate, which are disposed on a front surface and a back surface of a band-shaped OLED lighting sheet, respectively, a support body has one end portion at an upper side thereof which is fastened to one end portion of the lighting unit and supports the lighting unit so that the lighting unit is spaced apart from the ground, and a base is extended on the ground and supports the support body fastened to the lighting unit, thereby minimizing a thickness and providing light having improved brightness, by adopting an OLED as a light source.

10 Claims, 8 Drawing Sheets

(51) Int. Cl.
- *H01L 51/52* (2006.01)
- *F21S 6/00* (2006.01)
- H05B 33/10 (2006.01)
- H05B 33/12 (2006.01)

(52) U.S. Cl.
CPC ...... *H01L 2251/5361* (2013.01); *H05B 33/10* (2013.01); *H05B 33/12* (2013.01)

(56) References Cited

U.S. PATENT DOCUMENTS

| | | |
|---|---|---|
| 6,819,036 B2 * | 11/2004 | Cok .................. H01R 12/7076 313/318.01 |
| 2004/0032727 A1 | 2/2004 | Cok |
| 2010/0296264 A1 | 11/2010 | Ronda et al. |
| 2012/0201038 A1 | 8/2012 | Bimstock et al. |
| 2013/0235572 A1 | 9/2013 | Aurongzeb et al. |
| 2013/0248828 A1 | 9/2013 | Schaepkens et al. |

FOREIGN PATENT DOCUMENTS

| | | |
|---|---|---|
| KR | 10-2012-0084999 A | 7/2012 |
| KR | 10-2014-0103457 A | 8/2014 |
| TW | I286388 B | 9/2007 |

\* cited by examiner

[Figure 1]
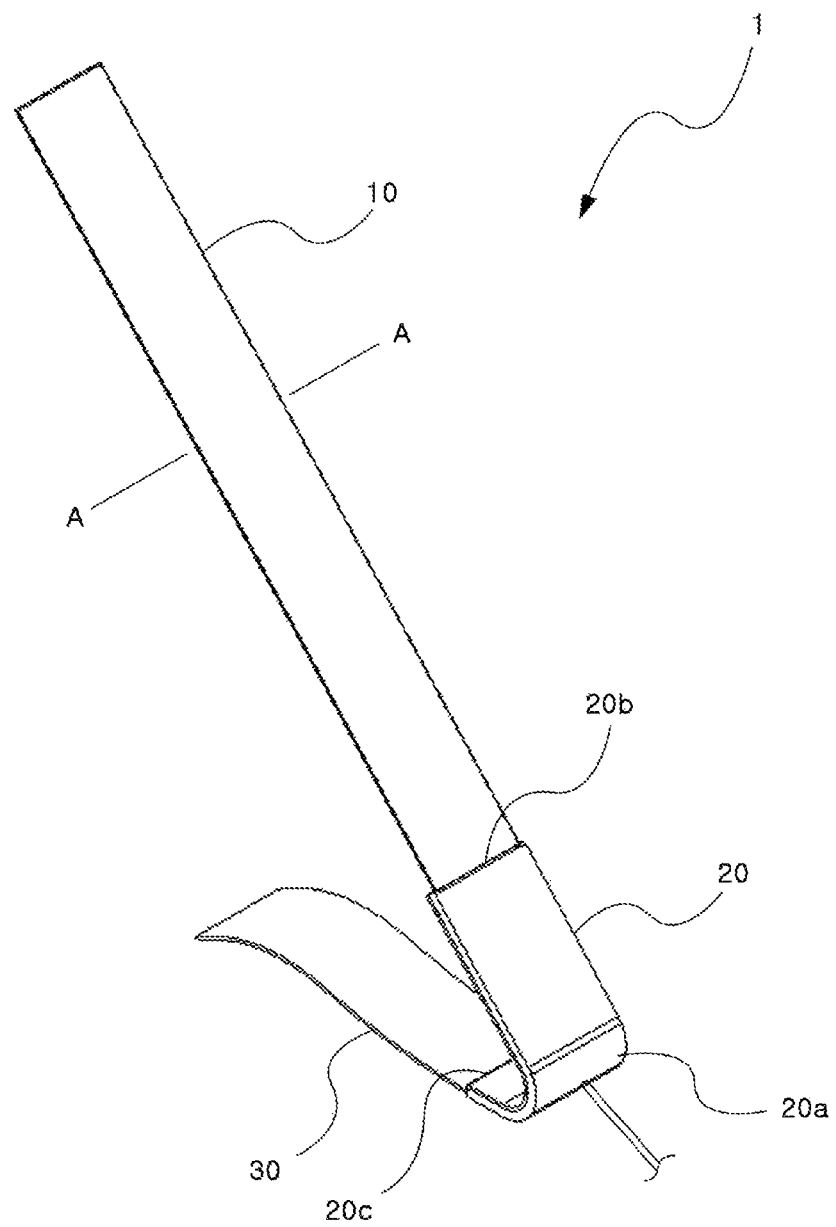

[Figure 2]
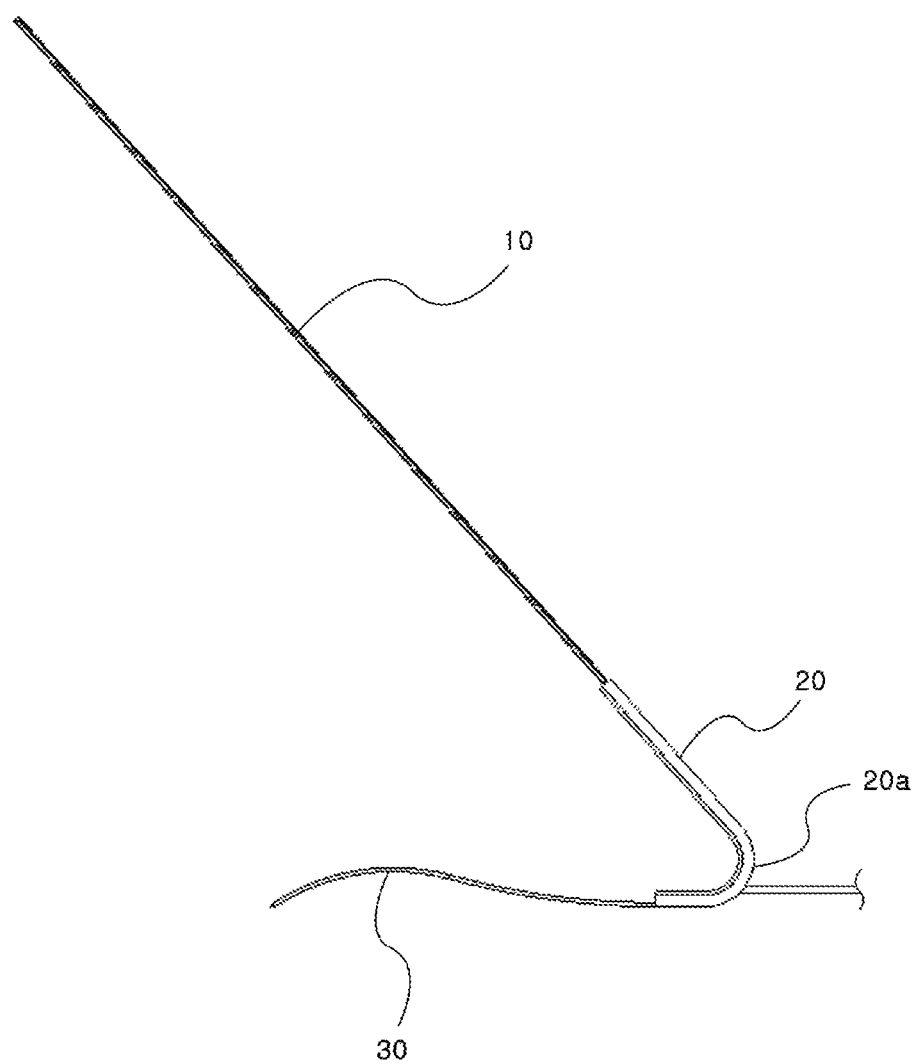

[Figure 3]
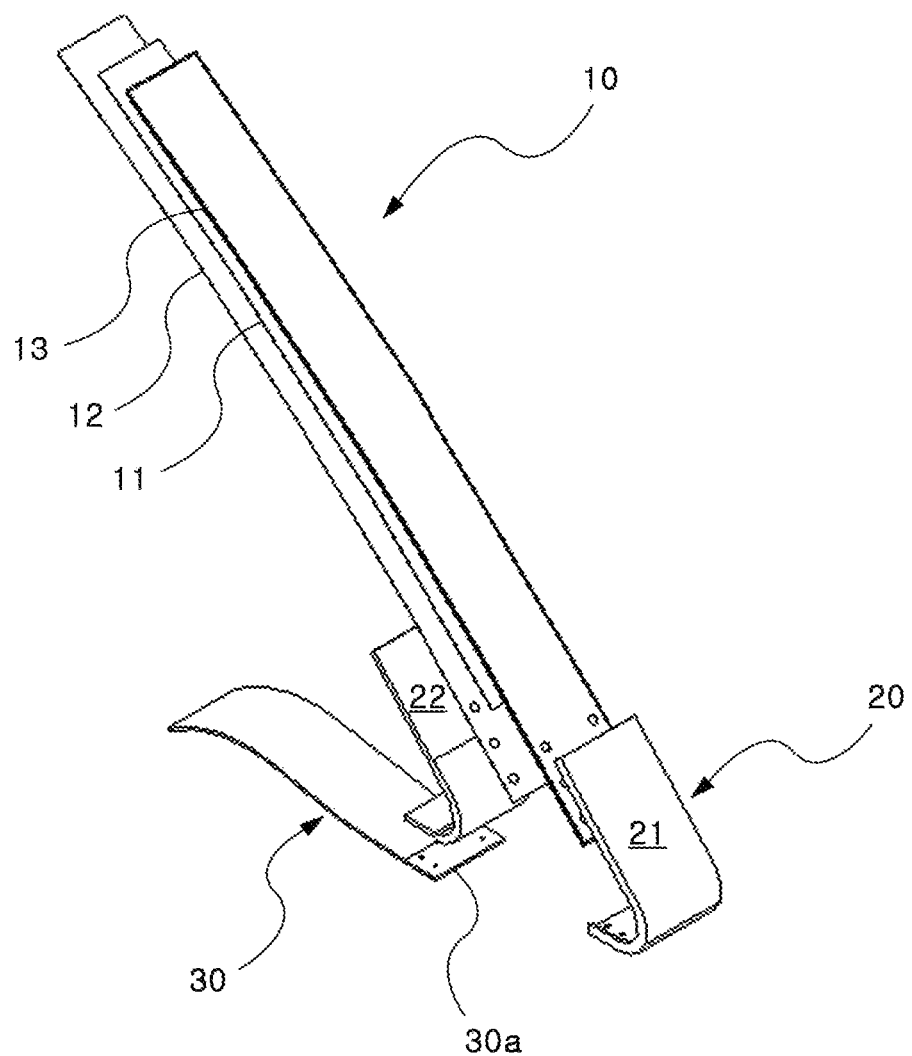

[Figure 4]
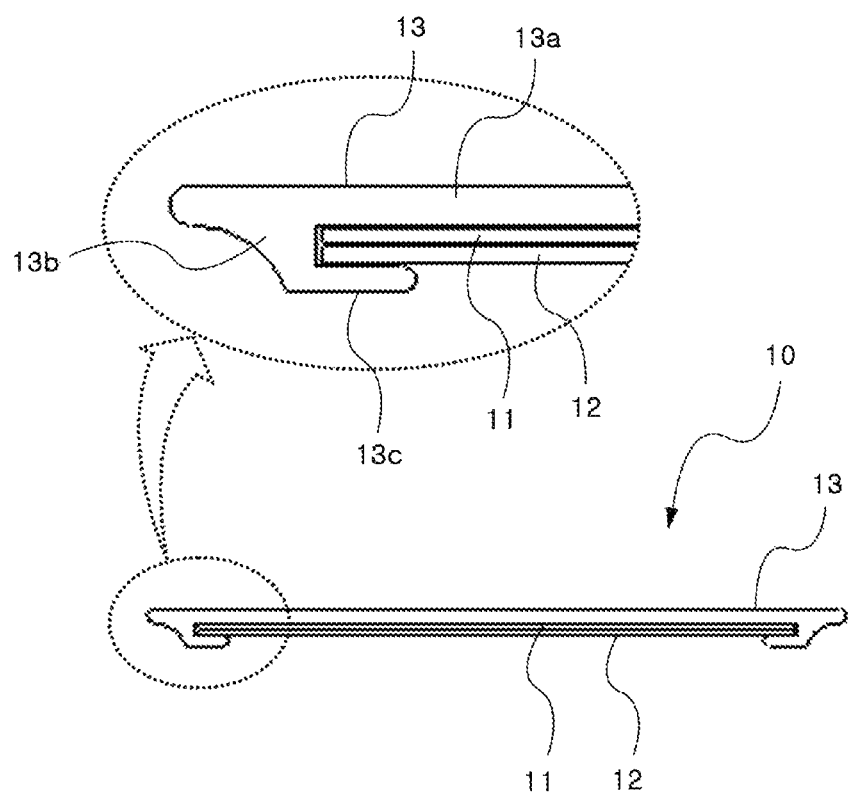

[Figure 5]
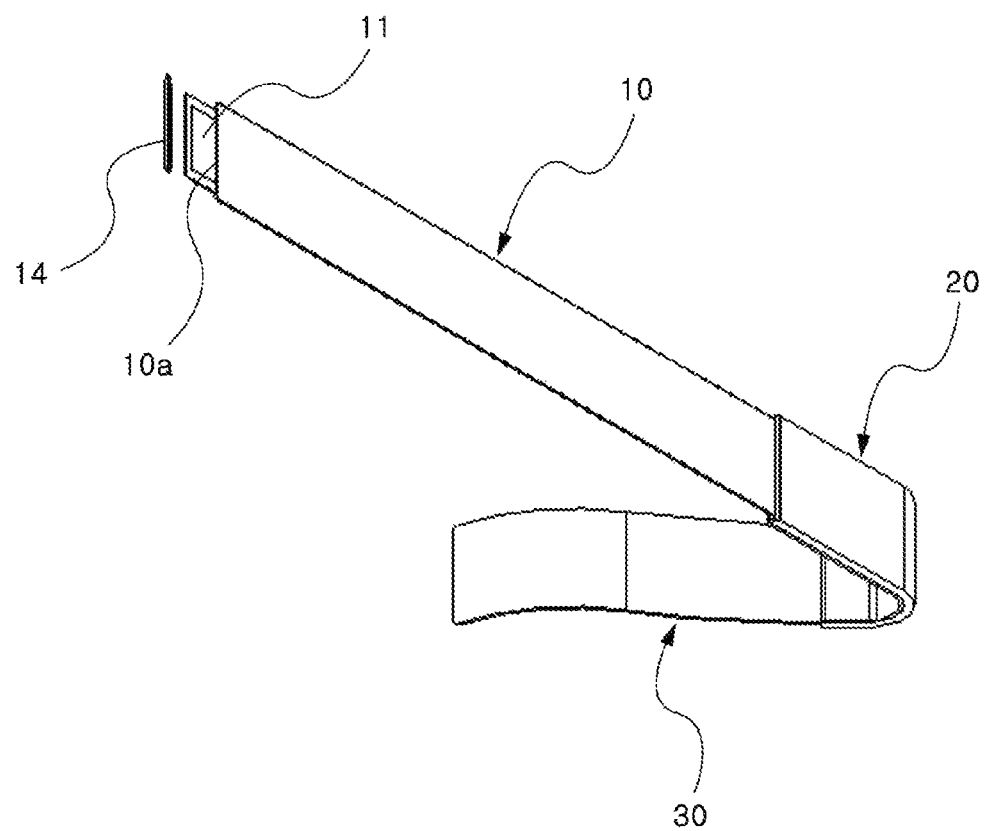

[Figure 6]
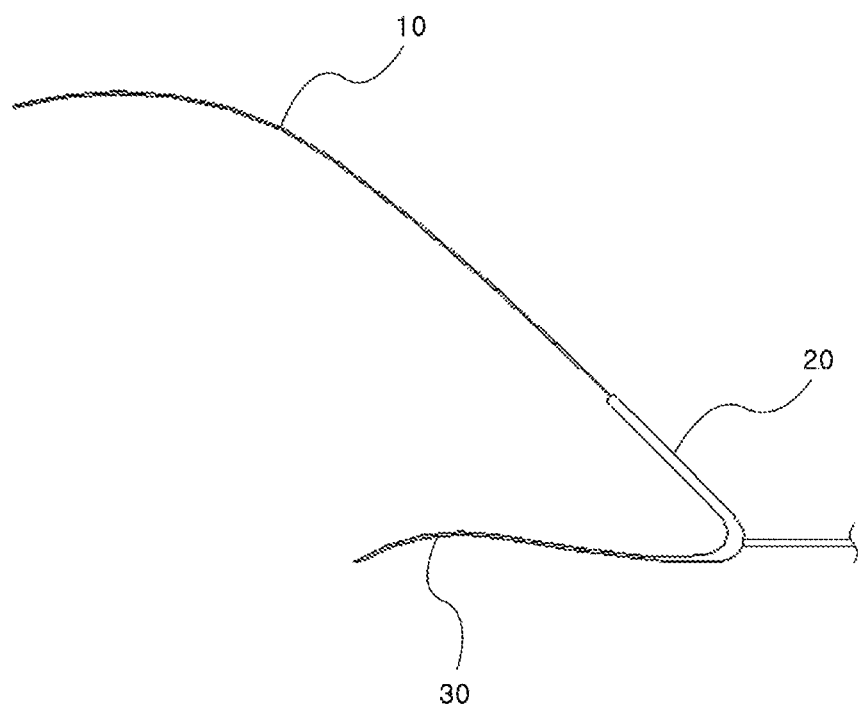

[Figure 7]
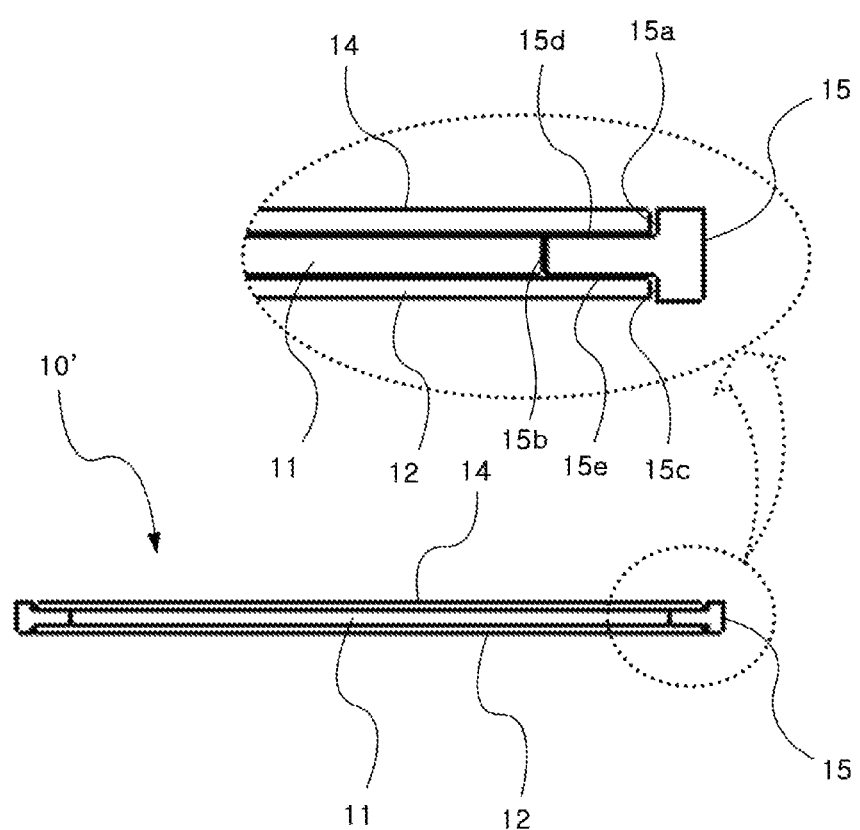

[Figure 8]
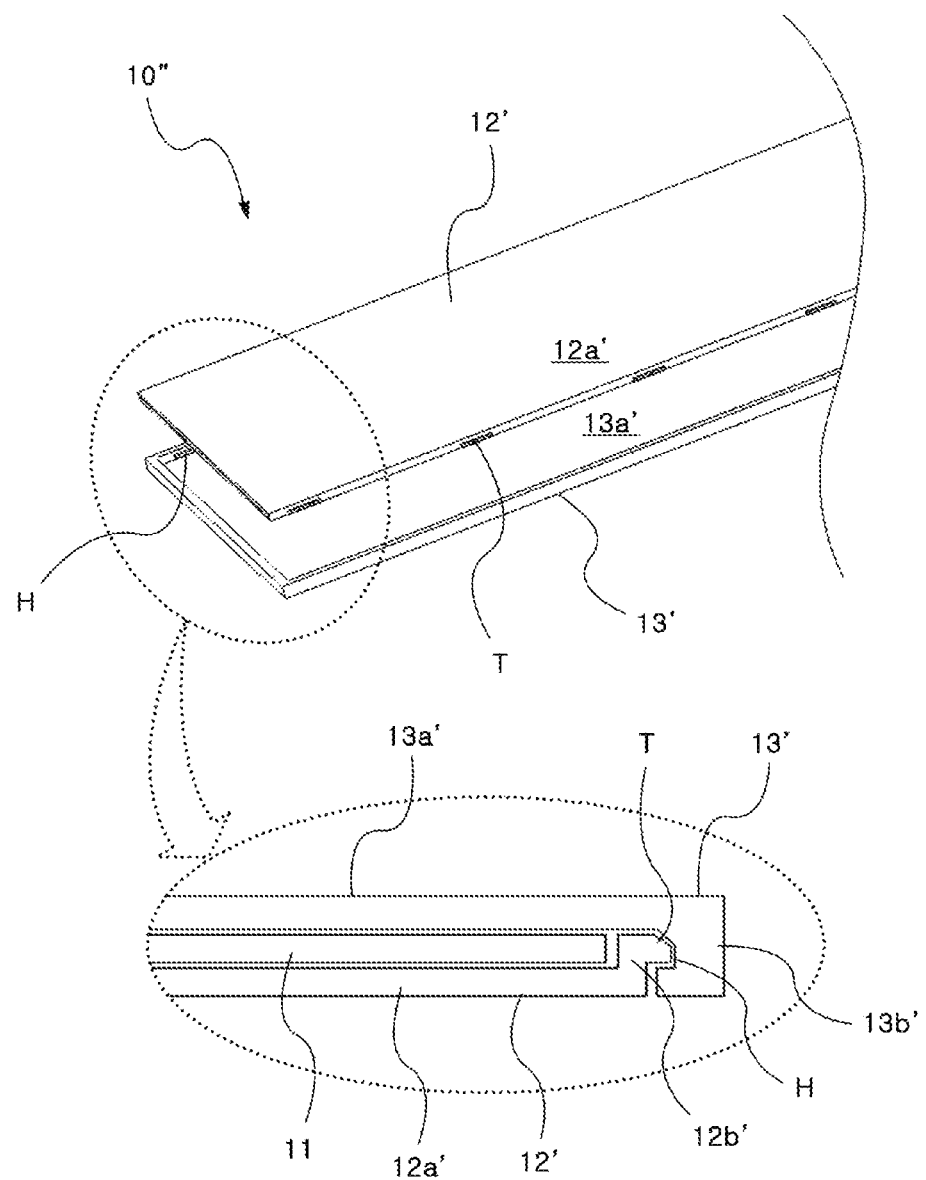

ND STAND

TECHNICAL FIELD

The present invention relates to an OLED standing lamp, and more particularly, to an OLED standing lamp in which a lighting unit includes a band-shaped transparent film and a band-shaped casing plate, which are disposed on a front surface and a back surface of a band-shaped OLED lighting sheet, respectively, a support body has one end portion at an upper side thereof which is fastened to one end portion of the lighting unit and supports the lighting unit so that the lighting unit is spaced apart from the ground, and a base is extended on the ground and supports the support body fastened to the lighting unit, thereby minimizing a thickness and providing light having improved brightness, by adopting an OLED as a light source.

BACKGROUND ART

Lamps such as an incandescent lamp and a fluorescent lamp have been mainly used as a standing lamp for lighting, but recently, as a lighting means being developed, more various types of products have been launched by virtue of development of new lighting means such as a light emitting diode (LED).

In particular, an organic light-emitting diode (OLED), which is being developed most recently, has an advantage in terms of high brightness, a thin film structure, and bendability, and as a result, the organic light-emitting diode is applied to various image devices such as a TV set.

Accordingly, the present invention applies the OLED, which may implement a thin film structure as described above, as a lighting means, and presents an OLED standing lamp which has more improved brightness than a standing lamp in the related art, and is more slim and elegant in design than the standing lamp in the related art.

DISCLOSURE

Technical Problem

The present invention has been made in an effort to provide an OLED standing lamp which make a lighting unit thin by combining a thin film type OLED lighting sheet, a transparent film, and a casing plate, thereby minimizing a thickness, and emitting light having improved brightness.

In addition, the present invention has been made in an effort to provide an OLED standing lamp which includes a lighting unit capable of changing a radius of curvature by using an OLED lighting sheet and a transparent film having flexibility as a light source of a lighting unit.

Technical Solution

An exemplary embodiment of the present invention provides an OLED standing lamp including: a lighting unit which has a band-shaped OLED lighting sheet, a band-shaped transparent film that is in surface-to-surface contact with a front surface of the OLED lighting sheet while being stacked on the front surface of the OLED lighting sheet, and a band-shaped casing plate that accommodates and supports the OLED lighting sheet and the transparent film in a state in which the casing plate is in surface-to-surface contact with a back surface of the OLED lighting sheet; a support body which has one end portion at an upper side thereof which is fastened to one end portion of the lighting unit and supports the lighting unit so that the lighting unit is spaced apart from the ground, and the other end portion at a lower side thereof which is extended toward the ground; and a base which is fastened to the other end portion of the support body and supports the lighting unit and the support body on the ground. Here, the casing plate may include a back cover portion which is in surface-to-surface contact with the back surface of the OLED lighting sheet, side protruding end portions which vertically protrude from both left and right surfaces of the back cover portion, to support the OLED lighting sheet and the transparent film at sides of the side protruding end portions, and guide arm portions which are extended inward from the side protruding end portions so as to be parallel with a front surface of the back cover portion, and in contact with and support surfaces at edges of the transparent film.

In this case, a finishing plug, which prevents the OLED lighting sheet and the transparent film accommodated in the casing plate from being exposed to the outside, may be fitted into and coupled to a free end portion of the lighting unit opposite to one end portion of the lighting unit which is fastened to the support body.

Meanwhile, the casing plate may include a back cover portion which is in surface-to-surface contact with the back surface of the OLED lighting sheet, and side frame portions which are attached to at least left and right edges of the back cover portion, vertically protrude toward the front surface, and are in contact with and support respective edges of the OLED lighting sheet and the transparent film at inner sides of the side frame portions toward a front surface of the back cover portion.

In the side frame portions, first vertical end portions which are in direct contact with and support at least left and right edges of the back cover portion, second vertical end portions which are in direct contact with and support at least left and right edges of the OLED lighting sheet, and third vertical end portions which are in direct contact with and support at least left and right edges of the transparent film may be sequentially formed.

The side frame portion may further include a first horizontal end portion which is formed between the first vertical end portion and the second vertical end portion, and attached to the edge of the front surface of the back cover portion, and a second horizontal end portion which is formed between the second vertical end portion and the third vertical end portion, and attached to the edge of the back surface of the transparent film.

The transparent film may include a front cover portion which is in surface-to-surface contact with the front surface of the OLED lighting sheet, and side end portions which vertically protrude from both left and right surfaces of the front cover portion, to support the OLED lighting sheet at sides of the side end portions, and the casing plate may include a back cover portion which is in surface-to-surface contact with the back surface of the OLED lighting sheet, and side protruding end portions which vertically protrude from both left and right surfaces of the back cover portion, to support the side end portions at sides of the side protruding end portions.

In this case, the side end portion of the transparent film may have a plurality of catching projections that protrudes in a longitudinal direction thereof, and the side protruding end portion of the casing plate may have catching recessed portions formed at positions corresponding to the plurality of catching projections.

The support body may have a curved portion that is formed at a middle portion of the support body and curved at a predetermined acute angle, and the support body may be fastened to one end portion of the lighting unit through one end portion of the support body which is extended from the curved portion, so as to allow the lighting unit to be inclinedly extended upward from the ground, and the other end portion of the support body, which is extended from the curved portion, may be extended to be parallel with the ground, and the base may be fastened to the other end portion of the support body and extended in a direction in which at least the lighting unit is vertically projected onto the ground, so as to support the lighting unit and the support body on the ground.

Advantageous Effects

As described above, the OLED standing lamp according to the present invention may have more improved brightness than a standing lamp in the related art by making the lighting unit thin by combining the OLED lighting sheet, the transparent film, and the casing plate, and may be more slim and elegant in design than the standing lamp in the related art.

In addition, there was a problem in that since a standing lamp in the related art uses a method in which components are attached by the existing screw, a double-sided tape, or the like when the lighting unit is assembled, a volume and a thickness increase, the number of working processes is increased, and a defect rate is high, but the lighting unit according to the present invention is assembled by a simple method of merely fitting the OLED lighting sheet and the transparent film into the casing plate or inserting the OLED lighting sheet and the transparent film into the casing plate in a sliding manner, thereby reducing a volume and a thickness, remarkably reducing the number of working processes, and greatly reducing a defect rate of a product according to assembly.

Furthermore, according to characteristics of the OLED, the OLED standing lamp may provide light close to natural light that could not be implemented by the existing standing lamp, and electrical power consumption may also be greatly decreased, thereby implementing an environmentally-friendly standing lamp.

In addition, the OLED lighting sheet may be used in a three-dimensionally curved shape by bending the OLED lighting sheet, and as a result, the lighting unit, which has a shape with a radius of curvature such as a circular or semi-circular shape, may be implemented, such that there is an advantage in that various designs may be implemented.

DESCRIPTION OF DRAWINGS

FIG. 1 is a perspective view of an OLED standing lamp according to a first exemplary embodiment of the present invention.

FIG. 2 is a side view of the OLED standing lamp of FIG. 1.

FIG. 3 is an exploded perspective view of the OLED standing lamp of FIG. 1.

FIG. 4 is a cross-sectional view taken along line AA of FIG. 1.

FIG. 5 is a perspective view illustrating the OLED standing lamp of FIG. 1, and a finishing plug applicable to the OLED standing lamp.

FIG. 6 is a side view illustrating a modified example of the OLED standing lamp of FIG. 1.

FIG. 7 is a cross-sectional view of an OLED standing lamp according to a second exemplary embodiment of the present invention.

FIG. 8 is a cross-sectional view of an OLED standing lamp according to a third exemplary embodiment of the present invention.

MODE FOR INVENTION

As illustrated in FIGS. 1 and 2, an OLED standing lamp 1 according to a first exemplary embodiment of the present invention includes a thin film type lighting unit 10 which is supported in a shape vertically inclined upward from the ground, and includes a lighting means, a support body 20 which is fastened to a lower end portion of the lighting unit 10, and formed as a curved body, and a base 30 which is fastened to an end portion of the support body 20 which is in contact with the ground, and supports the lighting unit 10 and the support body 20 relative to the ground.

As illustrated in FIG. 3, the lighting unit 10 includes a band-shaped OLED lighting sheet 11 as a lighting means, and includes a band-shaped transparent film 12 which is in surface-to-surface contact with a front surface of the OLED lighting sheet 11 while being stacked on the front surface of the OLED lighting sheet 11. The transparent film 12 allows light generated from the OLED lighting sheet 11 to pass therethrough, and serves to protect the OLED lighting sheet 11 from external impact.

In addition, the lighting unit 10 further includes a band-shaped casing plate 13 which accommodates and supports the OLED lighting sheet 11 and the transparent film 12.

As illustrated in FIG. 4, the casing plate 13 accommodates and supports the OLED lighting sheet 11 and the transparent film 12 using left and right edges of the casing plate 13 in a state in which the casing plate 13 is in surface-to-surface contact with a back surface of the OLED lighting sheet 11.

Specifically, the casing plate 13 includes a back cover portion 13a which is in surface-to-surface contact with the back surface (upper surface in FIG. 4) of the OLED lighting sheet 11, side protruding end portions 13b which vertically protrude from both left and right surfaces of the back cover portion 13a, and guide arm portions 13c which are extended inward from the side protruding end portions 13b so as to be parallel with the front surface of the back cover portion 13a.

The side protruding end portions 13b support the OLED lighting sheet 11 and the transparent film 12, which are vertically stacked, at sides of the side protruding end portions 13b, and the guide arm portions 13c are in contact with and support surfaces (bottom surfaces in FIG. 4) at edges of the transparent film 12, such that the OLED lighting sheet 11 and the transparent film 12 are accommodated and supported together in internal spaces which are formed by the guide arm portions 13c and the back cover portion 13a.

The casing plate 13 may be implemented by extrusion forming of aluminum, and the lighting unit 10 may be assembled in a way that the OLED lighting sheet 11 and the transparent film 12 are fitted into the casing plate 13 from one end portion in a longitudinal direction of the casing plate 13.

Meanwhile, as illustrated in FIG. 5, a finishing plug 14 having a thin rod shape is fitted into and coupled to an upper free end portion 10a of the casing plate 13 into which the OLED lighting sheet 11 and the transparent film 12 are fitted, thereby preventing the OLED lighting sheet 11 and the transparent film 12, which are fitted into and accommodated in the casing plate 13, from being exposed to the outside through the free end portion 10a.

As illustrated in FIGS. 1 and 2, the support body 20 has a curved portion 20a that is formed at a middle portion of the support body 20 and curved at a predetermined acute angle, and the support body 20 is fastened to the lower end portion of the lighting unit 10 through one end portion 20b of the support body, which is inclinedly extended upward from the curved portion 20a, so as to allow the lighting unit 10 to be inclinedly extended upward from the ground.

In addition, the other end portion 20c of the support body 20, which is horizontally extended from the curved portion 20a, is in surface-to-surface contact with the ground and extended in parallel with the ground.

As illustrated in FIG. 3, both cover bodies 21 and 22, which constitute the support body 20, are fastened together while interposing the lower end portion of the lighting unit 10, which is assembled as described above, between the cover bodies 21 and 22, thereby supporting the lighting unit 10.

A control circuit (not illustrated in the drawings) for turning on and off the OLED lighting sheet 11, supplying electric power, and adjusting brightness is embedded in the support body 20. In addition, switches (not illustrated in the drawings) to be operated by a user are installed on an outer plate surface of the support body 20.

As illustrated in FIGS. 1 to 3, the base 30 has one end portion 30a fastened to the other end portion 20c of the support body 20, and is formed to be extended in a direction in which at least the lighting unit 10 is vertically projected onto the ground, such that the lighting unit 10 and the support body 20 may be properly supported so as not to fall down laterally.

The base 30 is fastened together with both the cover bodies 21 and 22, which constitute the support body 20, in a state in which the base 30 is interposed between the cover bodies 21 and 22, such that the base 30 and the support body 20 form a single body.

Meanwhile, with flexibility of the OLED lighting sheet (11 in FIG. 3) that is applied to the lighting unit 10 as a light source as described above, the lighting unit 10 itself may be used in a three-dimensionally curved shape by bending the OLED lighting sheet 11 as necessary, as illustrated in FIG. 6 for example. Therefore, by using the flexibility of the OLED lighting sheet 11, it is possible to implement the lighting unit 10 having various designs having a radius of curvature such as three-dimensionally circular and semicircular shapes.

In a lighting unit 10' of an OLED standing lamp according to a second exemplary embodiment of the present invention, a casing plate includes a back cover portion 14, and side frame portions 15, as illustrated in FIG. 7.

The back cover portion 14 is in surface-to-surface contact with and supports the back surface (upper surface in the drawing) of the OLED lighting sheet 11, the side frame portions 15 are attached to left and right edges of a front surface (lower surface in the drawing) of the back cover portion 14, and vertically protrude toward the front surface, and the side frame portions 15 are in contact with and support respective edges of the OLED lighting sheet 11 and the transparent film 12 at inner sides of the side frame portions 15 toward a front surface of the back cover portion 14.

Specifically, the side frame portions 15 have a cross section having a rotated 'T' shape, respectively, in which first vertical end portions 15a which are in direct contact with and support left and right edges of the back cover portion 14, second vertical end portions 15b which are in direct contact with and support left and right edges of the OLED lighting sheet 11, and third vertical end portions 15c which are in direct contact with and support left and right edges of the transparent film 12 are sequentially formed.

Furthermore, the side frame portion 15 is attached to the edge of the front surface of the back cover portion 14 by a first horizontal end portion 15d formed between the first vertical end portion 15a and the second vertical end portion 15b, and attached to the edge of the back surface of the transparent film 12 through a second horizontal end portion 15e formed between the second vertical end portion 15b and the third vertical end portion 15c.

Here, the back cover portion 14 may be made of stainless steel or carbon, and the side frame portion 15 may be formed as an injection-molded product made of aluminum.

As illustrated in FIG. 8, a lighting unit 10" of an OLED standing lamp according to a third exemplary embodiment of the present invention includes a band-shaped transparent film 12' which is in surface-to-surface contact with a front surface of an OLED lighting sheet 11 while being stacked on the front surface of the OLED lighting sheet 11, and a band-shaped casing plate 13' which accommodates and supports the OLED lighting sheet 11 and the transparent film 12' at sides of the casing plate 13'.

The transparent film 12' includes a front cover portion 12a' which is in surface-to-surface contact with a front surface (bottom surface in the drawings) of the OLED lighting sheet 11, and side end portions 12b' which vertically protrude from both left and right surfaces of the front cover portion 12a', to support the OLED lighting sheet 11 at sides of the side end portions 12b'.

The casing plate 13' includes a back cover portion 13a' which is in surface-to-surface contact with a back surface (upper surface in the drawing) of the OLED lighting sheet 11, and side protruding end portions 13b' which vertically protrude from both left and right surfaces of the back cover portion 13a', to support the side end portions 12b' at sides of the side protruding end portions 13b'.

Accordingly, the lighting unit 10" has a thickness of the structure that is configured with only three layers: the OLED lighting sheet 11, the transparent film 12', and the casing plate 13', and as a result, the lighting unit, which is thinner than the lighting unit (10 in FIG. 4) of the first exemplary embodiment that adopts a slide assembly manner, may be implemented.

In this case, as illustrated in FIG. 8, a plurality of catching projections T protrudes in a longitudinal direction of the side end portion 12b' of the transparent film 12', and catching recessed portions H are formed at positions of the side protruding end portion 13b' of the casing plate 13', which correspond to the plurality of catching projections T, such that the catching projections T and the catching recessed portions H may be fastened to each other when assembled.

Meanwhile, the aforementioned OLED standing lamps are merely the exemplary embodiments for helping to understand the present invention, and it should be understood that the scope or the technical scope of the present invention is not limited to the aforementioned description.

The invention claimed is:
1. An OLED standing lamp comprising:
 a lighting unit including a band-shaped OLED lighting sheet, a band-shaped transparent film that is in surface-to-surface contact with a front surface of the OLED lighting sheet while being stacked on the front surface of the OLED lighting sheet, and a band-shaped casing plate that accommodates and supports the OLED lighting sheet and the transparent film using left and right edges in a state in which the casing plate is in surface-to-surface contact with a back surface of the OLED lighting sheet;

a support body including a first end portion at an upper side thereof which is fastened to a proximal end portion of the lighting unit and supports the lighting unit so that the lighting unit is spaced apart from the ground, a second end portion at a lower side thereof which is extended toward the ground, and a curved portion formed at a middle portion of the support body between the first and second end portions; and a base which is fastened to the second end portion of the support body and supports the lighting unit and the support body on the ground, wherein the lighting unit is assembled such that the OLED lighting sheet and the transparent film are fitted into the casing plate in a sliding manner from a distal end portion of the lighting unit in a longitudinal direction of the casing plate such that the distal end portion of the lighting unit is opposite to the proximal end portion of the lighting unit, and wherein the first end portion of the support body and the second end portion of the support body project in a same direction relative to a lateral direction that is parallel to the ground.

2. The OLED standing lamp of claim 1, wherein the casing plate includes a back cover portion which is in surface-to-surface contact with the back surface of the OLED lighting sheet, side protruding end portions which vertically protrude from both left and right surfaces of the back cover portion, to support the OLED lighting sheet and the transparent film at sides of the side protruding end portions, and guide arm portions which are extended inward from the side protruding end portions so as to be parallel with a front surface of the back cover portion, and in contact with and support surfaces at edges of the transparent film.

3. The OLED standing lamp of claim 2, wherein a finishing plug is fitted into and coupled to a free end at the distal end portion of the lighting unit.

4. The OLED standing lamp of claim 1, wherein the casing plate includes a back cover portion which is in surface-to-surface contact with the back surface of the OLED lighting sheet, and side frame portions which are attached to at least left and right edges of the back cover portion, vertically protrude toward the front surface, and are in contact with and support respective edges of the OLED lighting sheet and the transparent film at inner sides of the side frame portions toward a front surface of the back cover portion.

5. The OLED standing lamp of claim 4, wherein in the side frame portions, first vertical end portions which are in direct contact with and support at least left and right edges of the back cover portion, second vertical end portions which are in direct contact with and support at least left and right edges of the OLED lighting sheet, and third vertical end portions which are in direct contact with and support at least left and right edges of the transparent film are sequentially formed.

6. The OLED standing lamp of claim 5, wherein the side frame portion further has a first horizontal end portion which is formed between the first vertical end portion and the second vertical end portion, and attached to the edge of the front surface of the back cover portion, and a second horizontal end portion which is formed between the second vertical end portion and the third vertical end portion, and attached to the edge of the back surface of the transparent film.

7. The OLED standing lamp of claim 1, wherein the transparent film includes a front cover portion which is in surface-to-surface contact with the front surface of the OLED lighting sheet, and side end portions which vertically protrude from both left and right surfaces of the front cover portion, to support the OLED lighting sheet at sides of the side end portions, and the casing plate includes a back cover portion which is in surface-to-surface contact with the back surface of the OLED lighting sheet, and side protruding end portions which vertically protrude from both left and right surfaces of the back cover portion, to support the side end portions at sides of the side protruding end portions.

8. The OLED standing lamp of claim 7, wherein the side end portion of the transparent film has a plurality of catching projections that protrudes in a longitudinal direction thereof, and the side protruding end portion of the casing plate has catching recessed portions formed at positions corresponding to the plurality of catching projections.

9. The OLED standing lamp of claim 1, wherein the support body has a curved portion that is formed at a middle portion of the support body and curved at a predetermined acute angle, and the support body is fastened to the proximal end portion of the lighting unit through the first end portion of the support body which is extended from the curved portion, so as to allow the lighting unit to be inclinedly extended upward from the ground, and the second end portion of the support body, which is extended from the curved portion, is extended to be parallel with the ground, and the base is fastened to the second end portion of the support body and extended in a direction in which at least the lighting unit is vertically projected onto the ground, so as to support the lighting unit and the support body on the ground.

10. The OLED standing lamp of claim 9, wherein the base is fastened to the second end portion of the support body to be extended in a laterally same direction as the distal end of the lighting unit.

* * * * *